(12) United States Patent
Noda (10) Patent No.: US 7,623,307 B2
(45) Date of Patent: Nov. 24, 2009

(54) IMAGING LENS

(75) Inventor: Takayuki Noda, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 31 days.

(21) Appl. No.: 11/524,405

(22) Filed: Sep. 21, 2006

(65) Prior Publication Data

US 2007/0064316 A1    Mar. 22, 2007

(30) Foreign Application Priority Data

Sep. 22, 2005   (JP)   ............................ P2005-275981

(51) Int. Cl.
*G02B 9/12* (2006.01)
(52) U.S. Cl. .................... 359/784; 359/737; 359/566
(58) Field of Classification Search ......... 359/784–792, 359/737, 566–576
See application file for complete search history.

(56) References Cited

U.S. PATENT DOCUMENTS

| | | | |
|---|---|---|---|
| 5,493,441 A | 2/1996 | Chipper | |
| 5,543,966 A | 8/1996 | Meyers | |
| 6,055,105 A | 4/2000 | Boku et al. | |
| 6,101,035 A * | 8/2000 | Maruyama | 359/565 |
| 6,262,844 B1 * | 7/2001 | Soskind | 359/565 |
| 6,839,174 B1 | 1/2005 | Ohde et al. | |
| 2003/0223129 A1 | 12/2003 | Huang | |
| 2005/0094292 A1 | 5/2005 | Cahall et al. | |
| 2006/0092529 A1* | 5/2006 | Zeng et al. | 359/784 |

FOREIGN PATENT DOCUMENTS

| | | |
|---|---|---|
| JP | 10-90596 A | 4/1998 |
| JP | 2004-191844 A | 7/2004 |
| WO | WO-97/44689 A1 | 11/1997 |
| WO | WO-02/29797 A1 | 4/2002 |
| WO | WO-2005101084 A1 | 10/2005 |

* cited by examiner

*Primary Examiner*—Darryl J Collins
(74) *Attorney, Agent, or Firm*—Birch, Stewart, Kolasch & Birch, LLP

(57) ABSTRACT

An imaging lens is provided and includes: in order from an object side of the imaging lens, a first lens having a positive refractive power; a second lens having one of a positive refractive power and a negative refractive power; and a third lens that corrects for aberration. At least one of the first and second lenses has a diffractive optical surface, the diffractive optical surface having twenty or less orbicular gratings in a range to pass an effective light ray.

20 Claims, 6 Drawing Sheets

FIG. 1

← OBJECT SIDE       IMAGING PLANE SIDE →

FIG. 2

DIFFRACTIVE OPTICAL SURFACE,
NUMBER OF ORBICULAR GRATINGS: EIGHT

FIG. 3

← OBJECT SIDE    IMAGING PLANE SIDE →

FIG. 4

DIFFRACTIVE OPTICAL SURFACE,
NUMBER OF ORBICULAR GRATINGS: FIFTEEN

FIG. 5

← OBJECT SIDE    IMAGING PLANE SIDE →

FIG. 6

DIFFRACTIVE OPTICAL SURFACE,
NUMBER OF ORBICULAR GRATINGS: ELEVEN

FIG. 7

◄— OBJECT SIDE    IMAGING PLANE SIDE —►

FIG. 8
DIFFRACTIVE OPTICAL SURFACE,
NUMBER OF ORBICULAR GRATINGS: EIGHT

IMAGING LENS

BACKGROUND OF THE INVENTION

1. Field of the Invention

The present invention relates to an imaging lens for use on a digital imaging device for a monitor camera, a vehicular camera or the like having a solid-state imaging device, such as of CCD or MOS, and more particularly to a light-weighted small-sized imaging lens to be suitably applied for a cellular phone camera.

2. Description of Background Art

As the solid-state imaging device reduces in size and the number of pixels thereof increases, the imaging lenses for use on various digital imaging devices are required smaller in size and more favorable in optical performance obtainable. Particularly, for the imaging lenses to be mounted on the popular cellular phone, manufacture at lower cost is required in addition to that desire.

There is a proposal on an imaging lens that optical performances are favorably obtained by the provision of a lens with a diffractive optical surface while keeping the two or three lens structure (see JP-A-2004-191844 and JP-A-10-90596).

However, it is difficult for the two-lens structure, described in JP-A-2004-191844 and JP-A-10-90596, to satisfy the desire in respect of optical performances.

Meanwhile, the three-lens structure described in JP-A-10-90596 has a first lens, arranged closest to the object, having a negative refractive power, thus being made as a retro-focus type whose back focus is longer than the overall combined focal length. This results in an increased overall length, and thus the lens is not suited as a cellular-phone imaging lens where size reduction is desired.

SUMMARY OF THE INVENTION

An object of an illustrative, non-limiting embodiment of the invention is to provide an imaging lens, which is short in overall length and capable of obtaining optical performances favorably even when the imaging lens is made in the three-lens structure.

One aspect of the invention is an imaging lens including: in order from an object side of the imaging lens, a first lens having a positive refractive power; a second lens having one of a positive refractive power and a negative refractive power; and a third lens that corrects for aberration. At least one of the first and second lenses has a diffractive optical surface, the diffractive optical surface having twenty or less orbicular gratings in a range to pass an effective light ray.

In one aspect of the invention, where an aperture stop is arranged on an object side of the first lens or between the first and second lenses, it is preferable that a lens arranged closest to the aperture stop has the diffractive optical surface on a surface having a form, which is in the range pass the effective light ray, smaller in overall change than that of an opposite surface of the lens.

However, where the aperture stop is arranged on an object side of the first lens, there is a possible case that the diffractive optical surface is preferably provided in a surface of the second lens closer to an object (i.e., a surface on an object side of the second lens).

Conditional expression (1) below is satisfied:

$$E/(N_d-1) > 0.00200 \text{ mm}$$

wherein E represents a depth of the orbicular gratings, and $N_d$ represents a refractive index at a d-line of a lens having the orbicular gratings.

BRIEF DESCRIPTION OF THE DRAWINGS

The features of the invention will appear more fully upon consideration of the exemplary embodiment of the invention, which are schematically set forth in the drawings, in which.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment, an imaging lens can be made as so-called a telephoto type by providing a first lens with a positive refractive power, thereby making it possible to reduce the overall length.

Meanwhile, although there is a usual tendency to cause a chromatic aberration on a telephoto type, the imaging lens is allowed to suitably correct for on-axis chromatic aberration by providing a diffractive optical surface in at least one surface of the first and second lenses.

Meanwhile, by providing, in the diffractive optical surface, twenty or less orbicular gratings that are in a range to pass effective rays of light, the diffractive optical surface is made easy to fabricate thereby suppressing the manufacture cost. In addition, the occurrence of flare can be suppressed by enhancing the diffraction efficient.

With reference to the drawings, an embodiment in the present invention will now be explained in detail.

Figure 1:
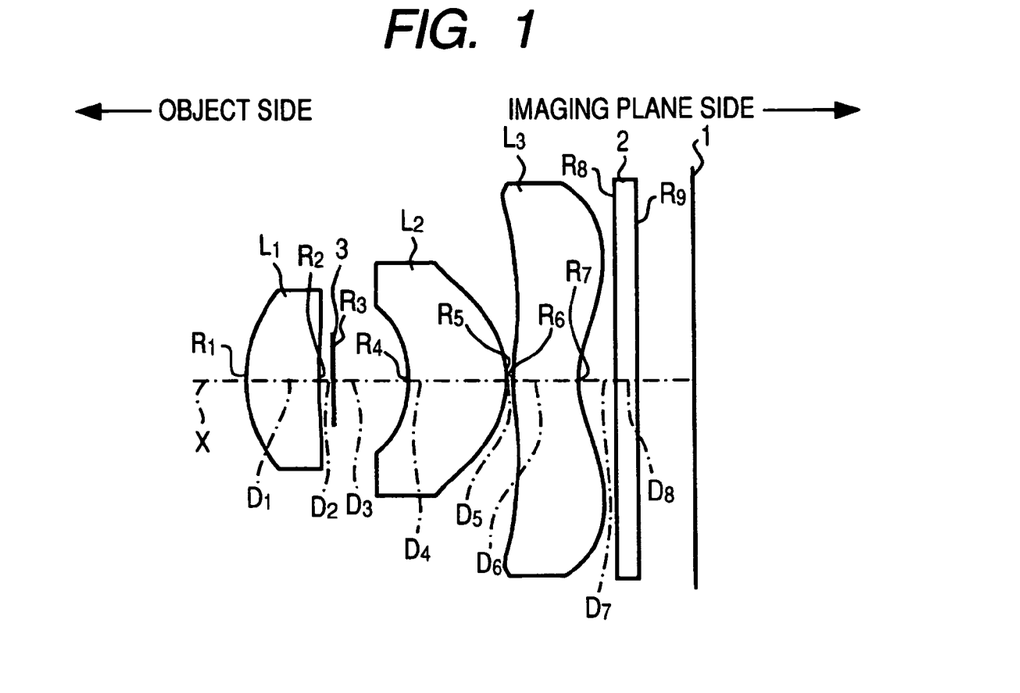
FIG. 1 is a view showing a structure of an imaging lens according to an exemplary embodiment 1.

FIG. 1 is a view showing an imaging lens according to an exemplary embodiment 1 of the present invention.

AN imaging lens, in the embodiment illustrated, is in a three-lens structure suitably applicable for a cellular phone camera. The imaging lens, having a horizontal angle of view of 50 degrees or greater, is arranged with a first lens $L_1$ having a positive refractive power, a second lens $L_2$ having a positive or negative refractive power, and a third lens $L_3$ for aberration correction (whose refractive power may be positive or negative).

A diffractive optical surface is provided in at least one of the first and second lenses $L_1$, $L_2$. The refractive optical surface is formed to have twenty or less orbicular gratings that are in a range to pass effective rays of light. Where to enhance the resolution, the total number of orbicular gratings is preferably provided 10 or less.

Meanwhile, a solid-state imaging device 1, such as of CCD or CMOS, is arranged in a position nearly corresponding to an imaging plane (a focal plane) of the imaging lens of this embodiment. The solid-state imaging device 1 is arranged with its cover glass (including various filters) 2 in a position closer to the object. Furthermore, an aperture stop 3 is arranged between the first lens $L_1$ and the second lens $L_2$.

In the imaging lens of the embodiment, the diffractive optical surface is preferably provided in a surface, of the both surfaces of the lens (first lens $L_1$) arranged closest to the aperture stop 3, whose surface shape is smaller in overall change in a range to pass effective rays of light, i.e. surface smaller in positional change in an optical-axis direction (surface closer to the image). The orbicular gratings in the diffractive optical surface are recessed inward of the basic surface (basic surface of the lens prior to forming a diffractive optical surface) (brazed in a manner recessed inward of the basic surface)

Preferably, provided that the orbicular gratings have a depth E and the lens has a refractive index $N_d$ at d-line where the relevant orbicular grating is formed, the conditional expression (1) is satisfied that is described in the section "Means for Solving the Problem" (described again in the following).

$$E/(N_d-1)>0.00200 (mm) \quad (1)$$

Incidentally, more preferably, the numeral in the right side of the conditional expression (1) is given as 0.00203 (mm).

Meanwhile, at least one of the first to third lenses $L_1$-$L_3$ is preferably made aspherical at least in one surface thereof.

Such a lens structure is significant, which is explained in the following.

Firstly, by providing the first lens with a positive refractive power, it can be made as so-called a telephoto type to reduce the overall length thereof.

Usually, the telephoto type readily causes a chromatic aberration. However, by providing a diffractive optical surface in at least one surface of the first and second lenses, it is possible to suitably correct for on-axis chromatic aberration.

Meanwhile, where the overall length is decreased, there is a usual tendency toward causing a curvature-of-field. However, by making the lens surface aspherical, such a curvature-of-field can be corrected suitably.

Meanwhile, the orbicular gratings, if increasing in the number in the diffractive optical surface, makes fabrication difficult, increases flare or reduces refractive efficiency. However, by reducing the total number of orbicular gratings down to 20 or less, it is possible to form a diffractive optical surface easily at low cost while keeping a suitable optical performance.

Meanwhile, by recessing the orbicular gratings inward of the basic surface of the lens, it is possible to move the focal point of a longer length of light than the reference wavelength, located axially closer to the image than the focal point of the reference wavelength of light, toward the object into a point closer to the focal point of the reference wavelength. This can relieve the on-axis chromatic aberration at the longer wavelength to be readily visually perceived more easily as compared at the shorter wavelength.

Meanwhile, the diffractive optical surface is provided in the surface closer to the image, on which side the surface shape wholly changes smaller in the range to pass effective rays of light, of the both surfaces of the first lens $L_1$ arranged closest to the aperture stop 3. This can reduce the variation in the incident angle of effective rays of light upon the diffractive optical surface, thus making the diffraction effect uniform in the diffractive optical surface regardless of the position relative to the optical axis.

Incidentally, in usual cases, diffraction effect can be obtained favorably by providing a diffractive optical surface to the lens arranged closest to the aperture stop 3. Nevertheless, there are cases that a diffractive optical surface cannot be provided to the lens arranged closest or that sufficient diffraction effect cannot be obtained by merely providing a diffractive optical surface to the lens arranged closest. Otherwise, where diffractive power is excessively given to the lens arranged closest, an inflection point is caused in the phase-difference function regulating the diffractive optical surface, possibly increasing flare.

In such a case, it is preferable to provide a diffractive optical surface to a lens other than the lens arranged closest to the aperture stop 3. However, in case the ratio increases of the rays of light passing through steps (portions rising axially) in the diffractive optical surface relative to the whole portion of rays of light passing the diffractive optical surface, there incurs a lowering in light amount. Hence, the provision is preferably in a position as close as to the aperture stop 3. Accordingly, where the problem like the above arises, the diffractive optical surface is provided in the object-side surface of the second lens $L_2$.

Meanwhile, by providing the orbicular grating with a depth E in a manner satisfying the conditional expression (1), −1-degree diffraction efficiency can be enhanced in the longer wavelength of visible portion of light (red region of light) wherein 0-degree diffraction effect can be reduced which is responsible for flare. This can relieve the bleeding of color.

An imaging lens in the invention will be explained in detail by using concrete embodiments.

Embodiment 1

Figure 2:
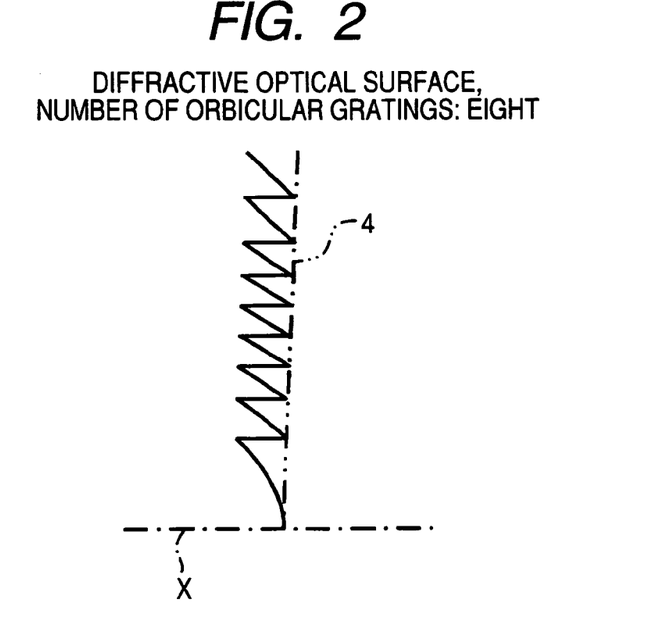
FIG. 2 is a magnification view of a diffractive optical surface according to an exemplary embodiment 1.

The imaging lens in embodiment 1 is structured as shown in FIG. 1. The descriptions made in the embodiment is omitted to explain, in order to avoid duplications. FIG. 2 is a magnification view (orbicular grating depth is depicted by exaggerating the depth thereof in order for easy viewing, which is true for the following FIGS. 4, 6 and 8) of a diffractive optical surface according to embodiment 1.

As shown in FIG. 1, the imaging lens in embodiment 1 is arranged with a first lens $L_1$ having a positive refractive power, an aperture stop 3, a second lens $L_2$ having a positive refractive power, and a third lens $L_3$ for correcting for aberration, in the order closer to the object. The first, second and third lenses $L_1$, $L_2$, $L_3$ are each structured aspherical at both surfaces.

The first lens $L_1$, arranged closest to the aperture stop 3, is provided with a diffractive optical surface on the side closer to the image. The diffractive optical surface is formed with totally eight orbicular gratings that are in the range to pass effective rays of light, as shown in FIG. 2. The orbicular gratings are recessed inward of the basic surface 24 of the first lens $L_1$ on a side closer to the image. The orbicular gratings in the diffractive optical surface are arranged to satisfy the conditional expression (1) provided that the orbicular grating has a dept E and the lens has a refractive index $N_d$ at d-line where the orbicular gratings are formed.

Concrete data is shown as to embodiment 1, which is as follows.

In the upper part of Table 1, there are shown a radius-of-curvature R of a lens surface in embodiment 1 (for aspherical surface, a radius-of-curvature in a position nearby the optical axis X, unit: mm), a lens surface-to-surface axial distance (lens center thickness and lens-to-lens air spacing) D (mm), a lens refractive index $N_d$ and Abbe's number at d-line (true for Tables 2 to 6).

In the middle part of Table 1, there is shown an aspherical coefficient of an aspherical surface represented by the expression (A) given below (true for Table 2 to 4).

In the lower part of Table 1, there is shown a coefficient in the diffractive-surface phase-difference function represented by the expression (B) given below (true for Table 2 to 4).

$$\Phi(r) = \sum C_{2j} r^{2j} \quad (B)$$

where r: height relative to the optical axis $C_{2j}$: coefficient (j=1−n) in a 2j-degree phase-difference function.

Table 5 shows a value corresponding to the conditional expression (1) according to embodiment 1. Incidentally, the orbicular gratings are given a depth of 1.08 μm (true for embodiments 2 to 4).

TABLE 1

<Embodiment 1>

| Surface | R | D | $N_d$ | $\nu_d$ |
|---|---|---|---|---|
| *1 | 1.9280 | 0.95254 | 1.51000 | 55.9 |
| #2 | 7.3649 | 0.15086 | | |
| 3 (stop) | ∞ | 1.00747 | | |
| *4 | −1.6456 | 1.34215 | 1.53156 | 55.1 |
| *5 | −1.2680 | 0.08803 | | |
| *6 | 3.7748 | 0.85048 | 1.5100 | 55.9 |
| *7 | 1.3889 | 0.49000 | | |
| 8 | ∞ | 0.30000 | 1.51633 | 64.1 |
| 9 | ∞ | | | |

Aspherical Coefficient

| Surface | K | $A_4$ | $A_6$ | $A_8$ | $A_{10}$ |
|---|---|---|---|---|---|
| 1 | 1.3758711 | −6.46254 × 10$^{-3}$ | −4.73864 × 10$^{-3}$ | 1.04847 × 10$^{-3}$ | −2.46811 × 10$^{-3}$ |
| 2 | −50.4819113 | −9.02361 × 10$^{-3}$ | −2.03963 × 10$^{-2}$ | −7.48449 × 10$^{-3}$ | 2.81508 × 10$^{-2}$ |
| 4 | −11.6542686 | −3.03184 × 10$^{-2}$ | 5.17639 × 10$^{-2}$ | −6.18129 × 10$^{-3}$ | −7.18424 × 10$^{-3}$ |
| 5 | 0.1264453 | −9.01419 × 10$^{-2}$ | 2.24564 × 10$^{-2}$ | −1.42315 × 10$^{-2}$ | 1.08418 × 10$^{-3}$ |
| 6 | −6.6759299 | −2.89483 × 10$^{-1}$ | 3.10469 × 10$^{-2}$ | −7.36380 × 10$^{-3}$ | 1.32804 × 10$^{-4}$ |
| 7 | 0.2359269 | −3.11377 × 10$^{-1}$ | 9.58924 × 10$^{-3}$ | −5.05163 × 10$^{-3}$ | 1.42112 × 10$^{-5}$ |

Phase-difference Function's Coefficient

| Surface | $C_2$ | $C_4$ | $C_6$ | $C_8$ | $C_{10}$ | $C_{12}$ |
|---|---|---|---|---|---|---|
| 2 | −1.66584 × 10$^2$ | 1.23934 × 10$^2$ | 9.07068 × 10 | −9.22082 × 10 | −1.47962 × 10$^2$ | 1.20365 × 10$^2$ |

*aspherical surface,
diffractive optical surface (aspherical coefficient + phase-difference function's coefficient).

$$Z = \frac{Y^2/R}{1 + \sqrt{1 - K \times Y^2/R^2}} + \sum_{i=3}^{n} A_i Y^i \quad (A)$$

where

Z: length of a perpendicular drawn from a point on an aspherical surface, distant Y from the optical axis, to a tangential plane (plane vertical to the optical axis) for the aspherical-surface peak, Y: distance from the optical axis R: radius-of-curvature of the aspherical surface, in a position nearby the optical axis K: eccentricity Ai: aspherical coefficient (i=3−n)

Figure 9:
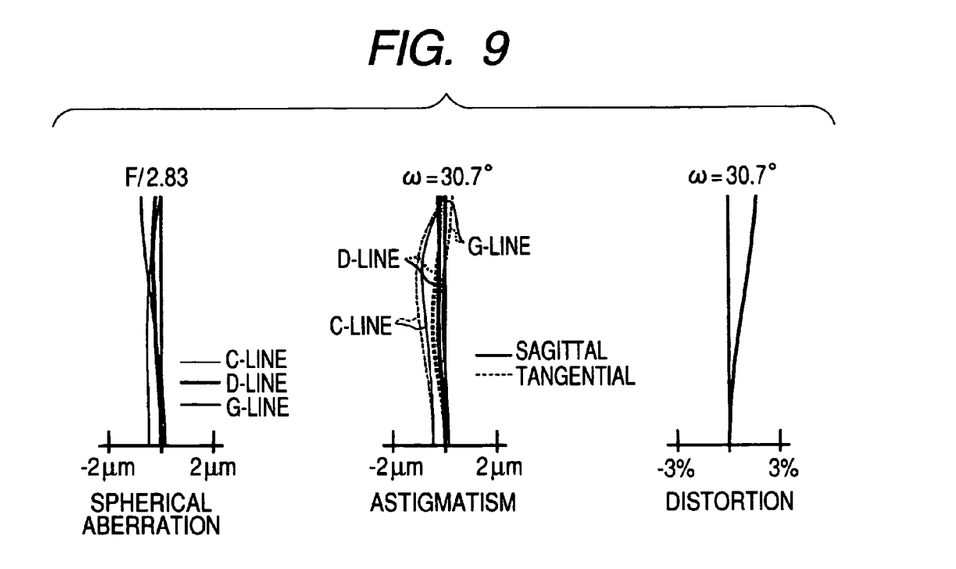
FIG. 9 is an aberration diagram showing aberrations (spherical aberration, astigmatism, distortion) on an imaging lens according to an exemplary embodiment 1.

Meanwhile, FIG. 9 is an aberration diagram showing aberrations (spherical aberration, astigmatism and distortion) on the imaging lens according to embodiment 1. In the aberration diagram, F represents an F-number and ω a half angle of view, respectively. Meanwhile, in the aberration diagrams related to astigmatism, aberration is shown on the sagittal and tangential image surfaces (true for FIGS. 10 to 12).

As shown in Table 1 and FIG. 9, the imaging lens in embodiment 1 is made short in overall length (5.92 mm) and can obtain a favorable optical performance despite that it is of the three-lens structure.

Embodiment 2

Figure 3:
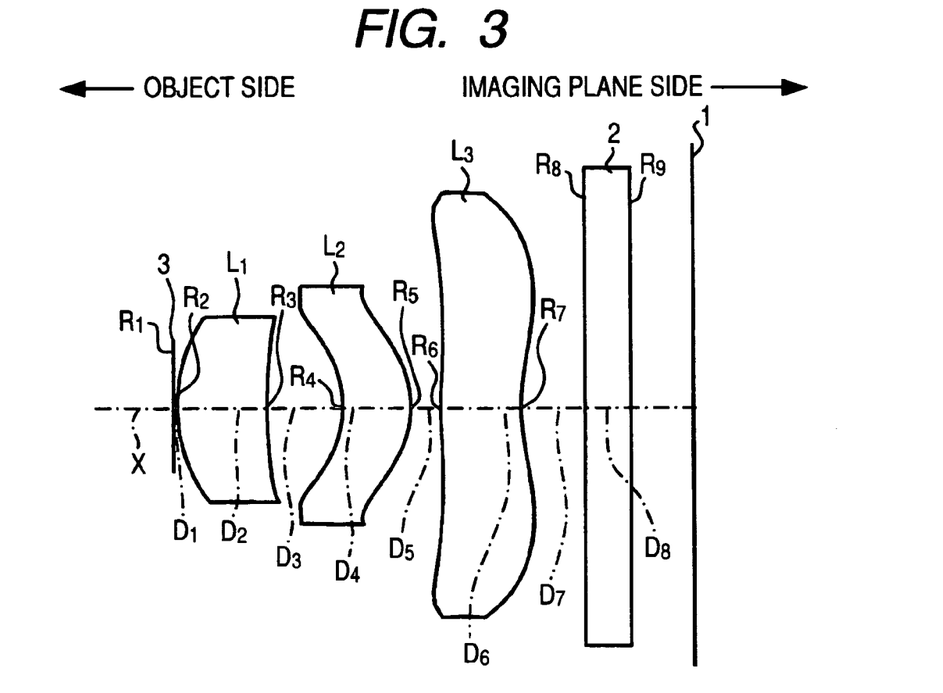
FIG. 3 is a view showing a structure of an imaging lens according to an exemplary embodiment 2.
Figure 4:
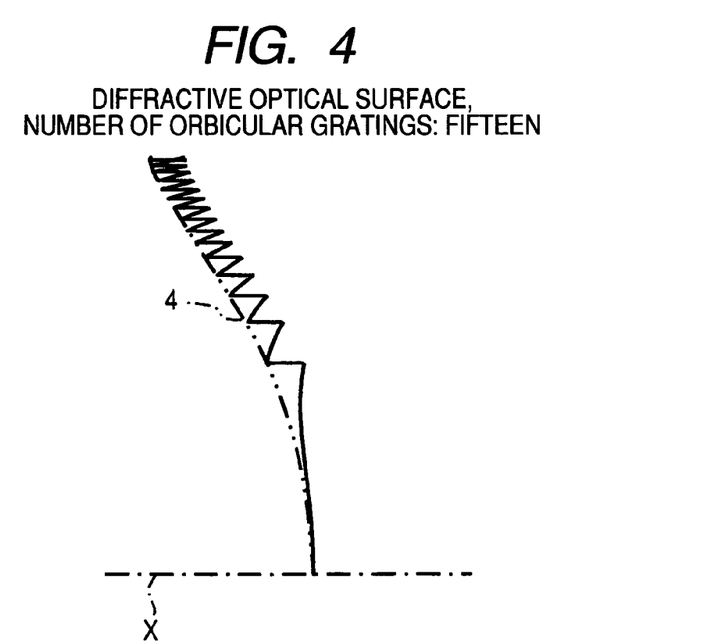
FIG. 4 is a magnification view of a diffractive optical surface according to an exemplary embodiment 2.

FIG. 3 is a view showing a structure of an imaging lens according to embodiment 2 while FIG. 4 is a magnification view of a diffractive optical surface according to embodiment 2.

As shown in FIG. 3, the imaging lens in embodiment 2 is arranged with an aperture stop 3, a first lens $L_1$ having a positive refractive power, a second lens $L_2$ having a negative refractive power, and a third lens $L_3$ for correcting for aberration, in the order closer to the object. The first, second and third lenses $L_1$, $L_2$, $L_3$ are each structured aspherical at both surfaces.

A diffractive optical surface is provided on the second lens $L_2$, in a surface closer to the object. It has totally fifteen orbicular gratings that are in a range to pass effective rays of light, as shown in FIG. 4. Meanwhile, the orbicular gratings in the diffractive optical surface are recessed inward of the object-side basic surface 4 of the second lens $L_2$. The orbicular gratings are structured to satisfy the conditional expression (1) provided that the orbicular gratings have a depth E and the lens has a refractive index $N_d$ at d-line where the orbicular grating is formed.

Concrete data is shown as to embodiment 1, which is as follows.

can obtain a favorable optical performance despite that it is of the three-lens structure.

Embodiment 3

Figure 5:
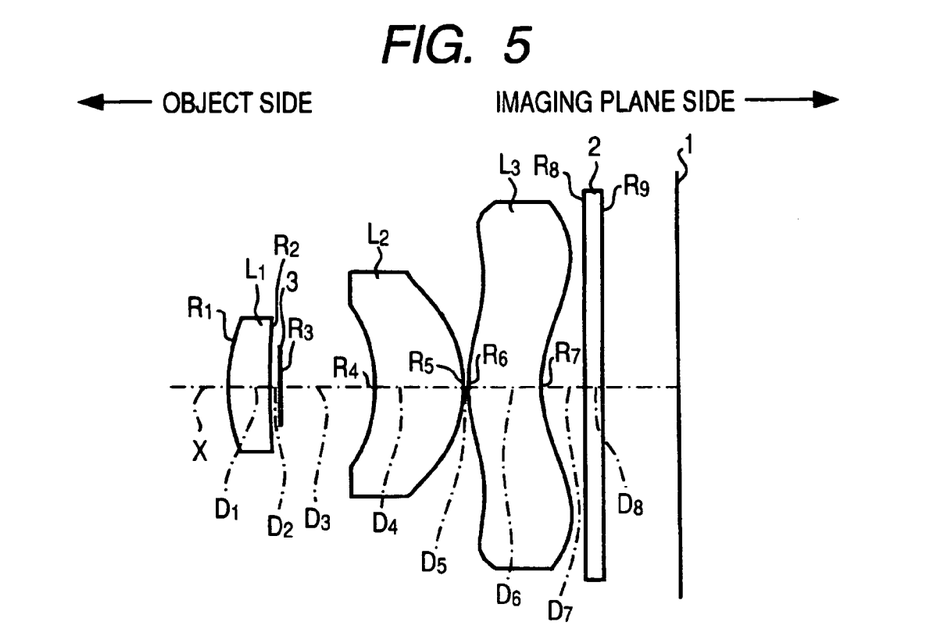
FIG. 5 is a view showing a structure of an imaging lens according to an exemplary embodiment 3.
Figure 6:
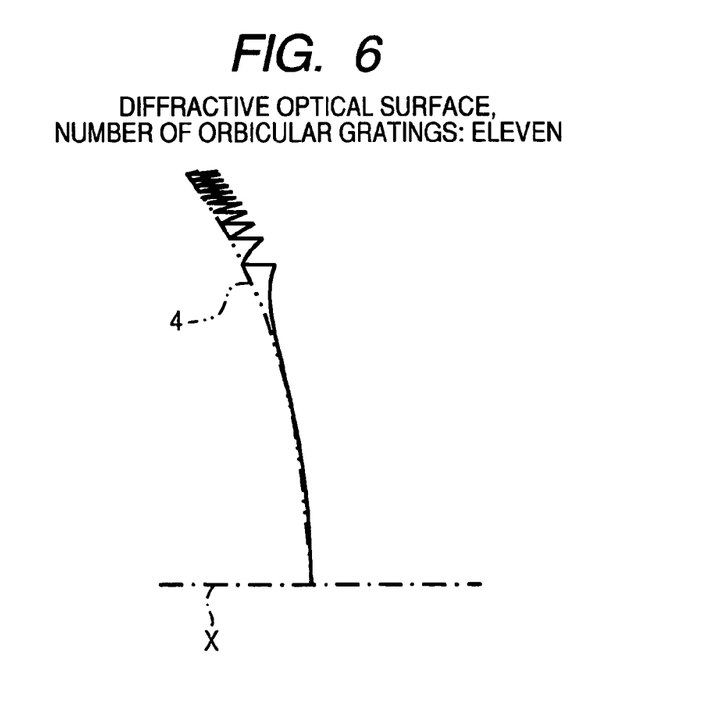
FIG. 6 is a magnification view of a diffractive optical surface according to an exemplary embodiment 3.

FIG. 5 is a view showing a structure of an imaging lens according to embodiment 3 while FIG. 6 is a magnification view of a diffractive optical surface according to embodiment 3.

As shown in FIG. 5, the imaging lens in embodiment 3 is arranged with a first lens $L_1$ having a positive refractive power, an aperture stop 3, a second lens $L_2$ having a positive refractive power, and a third lens $L_3$ for correcting for aberration, in the order closer to the object. The first lens $L_1$ is structured spherical at both surfaces while the second and third lenses $L_2$, $L_3$ are each structured aspherical at both surfaces.

A diffractive optical surface is provided on the second lens $L_2$, in a surface closer to the object. It has totally eleven

TABLE 2

<Embodiment 2>

| Surface | R | D | $N_d$ | $v_d$ |
|---|---|---|---|---|
| 1 (stop) | ∞ | 0.06058 | | |
| *2 | 1.9081 | 0.97564 | 1.56865 | 58.6 |
| *3 | 7.0338 | 0.81634 | | |
| #4 | −1.2690 | 0.75434 | 1.53105 | 55.5 |
| *5 | −1.2114 | 0.30181 | | |
| *6 | 4.0657 | 0.86829 | 1.53105 | 55.5 |
| *7 | 2.0986 | 0.70000 | | |
| 8 | ∞ | 0.50000 | 1.5168 | 64.2 |
| 9 | ∞ | | | |

Aspherical Coefficient

| Surface | K | $A_4$ | $A_6$ | $A_8$ | $A_{10}$ |
|---|---|---|---|---|---|
| 2 | 0.9791777 | $-3.27232 \times 10^{-2}$ | $-3.08358 \times 10^{-2}$ | $2.76182 \times 10^{-2}$ | $-2.16704 \times 10^{-3}$ |
| 3 | 24.0331511 | $-3.60169 \times 10^{-2}$ | $-2.06370 \times 10^{-2}$ | $8.59075 \times 10^{-3}$ | $1.29283 \times 10^{-2}$ |
| 4 | 1.0000000 | $-5.11412 \times 10^{-2}$ | $1.66619 \times 10^{-1}$ | $-1.39648 \times 10^{-1}$ | $9.94351 \times 10^{-2}$ |
| 5 | −2.7625231 | $-8.67807 \times 10^{-2}$ | $7.46022 \times 10^{-2}$ | $-1.14734 \times 10^{-2}$ | $2.51549 \times 10^{-3}$ |

| Surface | K | $A_3$ | $A_4$ | $A_5$ | $A_6$ |
|---|---|---|---|---|---|
| 6 | 0.5245590 | | $-1.90673 \times 10^{-2}$ | | $-6.06959 \times 10^{-4}$ |
| 7 | −12.8346458 | $-6.51862 \times 10^{-3}$ | $-2.80937 \times 10^{-2}$ | $-1.74083 \times 10^{-2}$ | $1.42621 \times 10^{-2}$ |

| Surface | $A_7$ | $A_8$ | $A_9$ | $A_{10}$ |
|---|---|---|---|---|
| 6 | $-2.28310 \times 10^{-3}$ | $-1.31138 \times 10^{-3}$ | $-1.54889 \times 10^{-4}$ | $2.84252 \times 10^{-4}$ |
| 7 | $-1.02097 \times 10^{-3}$ | $-4.58755 \times 10^{-4}$ | $-2.38133 \times 10^{-4}$ | $5.27465 \times 10^{-5}$ |

Coefficient in the Phase-difference Function

| Surface | $C_2$ | $C_4$ |
|---|---|---|
| 4 | $-6.80601 \times 10^{-1}$ | $-6.40495 \times 10$ |

*aspherical surface,
diffractive optical surface (aspherical coefficient + phase-difference function's coefficient).

Table 5 shows a value corresponding to the conditional expression (1) according to embodiment 2.

Figure 10:
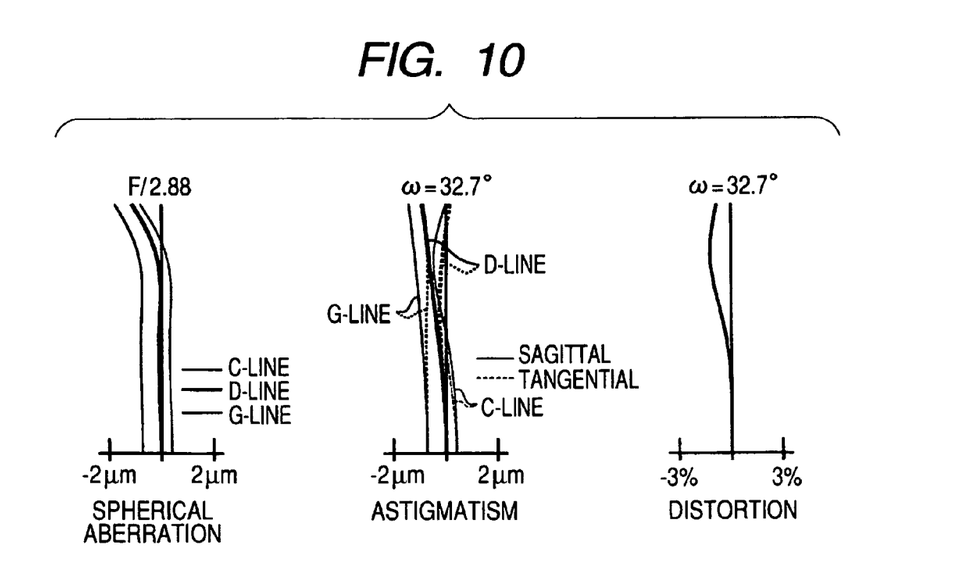
FIG. 10 is an aberration diagram showing aberrations (spherical aberration, astigmatism, distortion) on an imaging lens according to an exemplary embodiment 2.

Meanwhile, FIG. 10 is an aberration diagram showing aberrations (spherical aberration, astigmatism and distortion) on the imaging lens according to embodiment 2.

As shown in Table 2 and FIG. 10, the imaging lens in embodiment 2 is made short in overall length (5.63 mm) and orbicular gratings that are in a range to pass effective rays of light, as shown in FIG. 6. Meanwhile, the orbicular gratings in the diffractive optical surface are recessed inward of the object-side basic surface 4 of the second lens $L_2$. The orbicular gratings are structured to satisfy the conditional expression (1) provided that the orbicular gratings have a depth E and the lens has a refractive index $N_d$ at d-line where the orbicular grating is formed.

Concrete data is shown as to embodiment 3, which is as follows.

TABLE 3

<Embodiment 3>

| Surface | R | D | $N_d$ | $v_d$ |
|---|---|---|---|---|
| 1 | 3.0323 | 0.7000 | 1.56865 | 58.6 |
| 2 | 17.5073 | 0.1500 | | |
| 3 (stop) | ∞ | 1.5070 | | |
| #4 | −2.7174 | 1.4198 | 1.53039 | 55.3 |
| *5 | −2.1592 | 0.1000 | | |
| *6 | 2.9689 | 1.1984 | 1.56865 | 58.6 |
| *7 | 2.2759 | 0.70000 | | |
| 8 | ∞ | 0.3000 | 1.51633 | 64.1 |
| 9 | ∞ | | | |

Aspherical Coefficient

| Surface | K | $A_4$ | $A_6$ | $A_8$ | $A_{10}$ |
|---|---|---|---|---|---|
| 4 | −10.999809 | $-5.31946 \times 10^{-2}$ | $-6.47718 \times 10^{-4}$ | $-2.87076 \times 10^{-2}$ | $2.05235 \times 10^{-3}$ |
| 5 | 0.2598363 | $-2.61926 \times 10^{-2}$ | $8.70860 \times 10^{-4}$ | $9.15100 \times 10^{-3}$ | $2.96814 \times 10^{-3}$ |
| 6 | −8.8909957 | $-2.59061 \times 10^{-2}$ | $-3.90480 \times 10^{-3}$ | $5.86353 \times 10^{-3}$ | $3.41525 \times 10^{-4}$ |
| 7 | 0.4636357 | $-5.53443 \times 10^{-2}$ | $2.7396 \times 10^{-3}$ | $-2.81718 \times 10^{-3}$ | $-8.18746 \times 10^{-5}$ |

Phase-difference Function's Coefficient

| Surface | $C_2$ | $C_4$ | $C_6$ | $C_8$ | $C_{10}$ |
|---|---|---|---|---|---|
| 4 | $-4.45575 \times 10^{-7}$ | $-1.20631 \times 10^{-4}$ | $-1.97384 \times 10^{-2}$ | −1.85885 | −2.79850 |

*aspherical surface,
diffractive optical surface (aspherical coefficient + phase-difference function's coefficient).

Table 5 shows a value corresponding to the conditional expression (1) according to embodiment 3.

Figure 11:
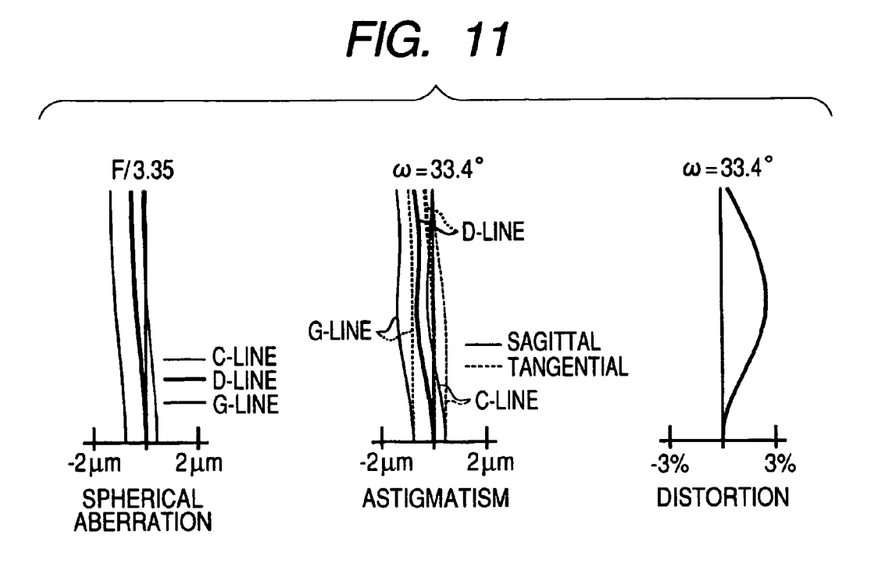
FIG. 11 is an aberration diagram showing aberrations (spherical aberration, astigmatism, distortion) on an imaging lens according to an exemplary embodiment 3.

Meanwhile, FIG. 11 is an aberration diagram showing aberrations (spherical aberration, astigmatism and distortion) on the imaging lens according to embodiment 3.

As shown in Table 3 and FIG. 11, the imaging lens in embodiment 3 is made short in overall length (7.42 mm) and can obtain a favorable optical performance despite that it is of the three-lens structure.

Embodiment 4

Figure 7:
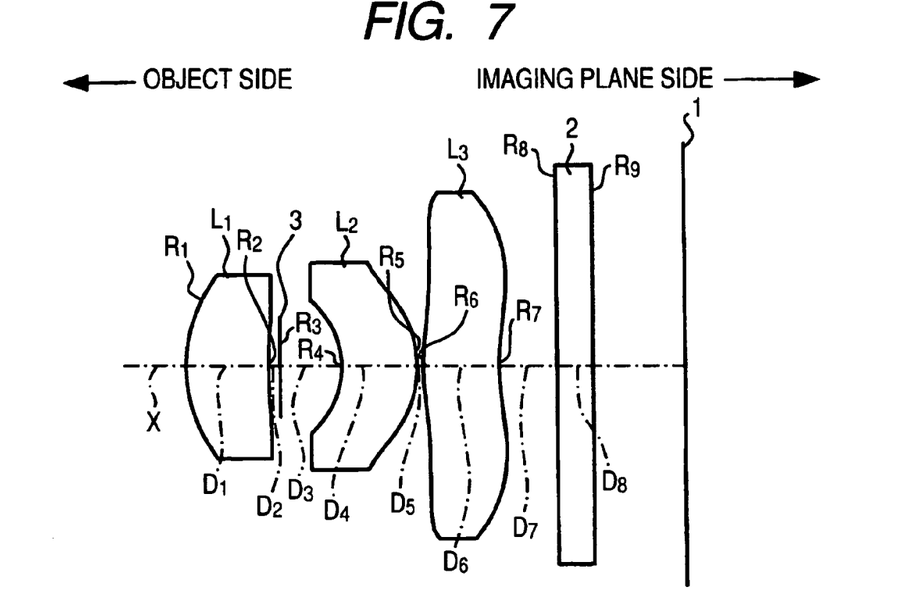
FIG. 7 is a view showing a structure of an imaging lens according to an exemplary embodiment 4.
Figure 8:
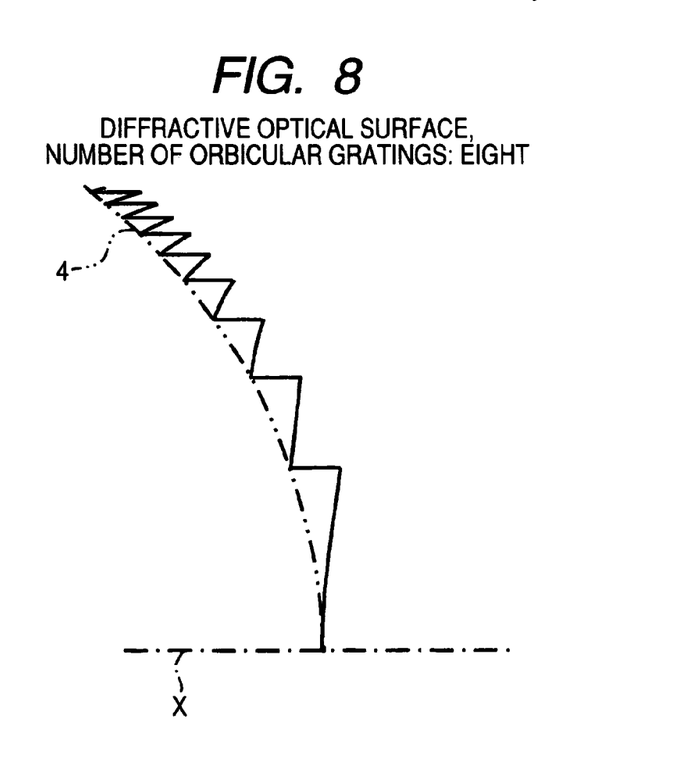
FIG. 8 is a magnification view of a diffractive optical surface according to an exemplary embodiment 4.

FIG. 7 is a view showing a structure of an imaging lens according to embodiment 4 while FIG. 8 is a magnification view of a diffractive optical surface according to embodiment 4.

As shown in FIG. 7, the imaging lens in embodiment 4 is arranged with a first lens $L_1$ having a positive refractive power, an aperture stop 3, a second lens $L_2$ having a positive refractive power, and a third lens $L_3$ having a positive refractive power, in the order closer to the object. The first, second and third lenses $L_1$, $L_2$ and $L_3$ are each structured aspherical at both surfaces.

A diffractive optical surface is provided on the second lens $L_2$, in a surface closer to the object. It has totally eight orbicular gratings that are in a range to pass effective rays of light, as shown in FIG. 8. Meanwhile, the orbicular gratings in the diffractive optical surface are recessed inward of the object-side basic surface 4 of the second lens $L_2$. The orbicular gratings are structured to satisfy the conditional expression (1) provided that the orbicular gratings have a depth E and the lens has a refractive index $N_d$ at d-line where the orbicular grating is formed.

Concrete data is shown as to embodiment 4, which is as follows.

TABLE 4

<Embodiment 4>

| Surface | R | D | $N_d$ | $v_d$ |
|---|---|---|---|---|
| *1 | 2.0432 | 1.0600 | 1.56865 | 58.6 |
| *2 | 7.4236 | 0.1200 | | |
| 3 (stop) | ∞ | 0.8300 | | |
| #4 | −1.1499 | 1.000 | 1.53156 | 55.1 |
| *5 | −1.6899 | 0.0800 | | |
| *6 | 2.6216 | 1.0000 | 1.54378 | 55.7 |
| *7 | 3.6935 | 0.7500 | | |
| 8 | ∞ | 0.5000 | 1.51633 | 64.1 |
| 9 | ∞ | | | |

TABLE 4-continued

| | | Aspherical Coefficient | | | |
|---|---|---|---|---|---|
| Surface | K | $A_4$ | $A_6$ | $A_8$ | $A_{10}$ |
| 1 | 0.0000000 | $1.70423 \times 10^{-2}$ | $-1.59664 \times 10^{-3}$ | $2.58981 \times 10^{-3}$ | $-1.84678 \times 10^{-3}$ |
| 2 | 0.0000000 | $-1.46779 \times 10^{-2}$ | $1.59753 \times 10^{-2}$ | $-8.14641 \times 10^{-2}$ | $6.88225 \times 10^{-2}$ |
| 4 | $-2.9858060$ | $-2.57549 \times 10^{-1}$ | $-2.29902 \times 10^{-2}$ | $1.77767 \times 10^{-1}$ | $-1.27163 \times 10^{-1}$ |
| 5 | 0.4158702 | $-4.56870 \times 10^{-2}$ | $-7.01168 \times 10^{-3}$ | $1.14051 \times 10^{-2}$ | $-1.87993 \times 10^{-2}$ |
| 6 | $-0.7700956$ | $-9.85448 \times 10^{-2}$ | $2.91582 \times 10^{-2}$ | $-6.18234 \times 10^{-3}$ | $6.26372 \times 10^{-4}$ |
| 7 | 2.2898215 | $-1.57316 \times 10^{-1}$ | $2.90756 \times 10^{-2}$ | $-6.55864 \times 10^{-3}$ | $-8.51607 \times 10^{-4}$ |

| | Phase-difference Function's Coefficient | | |
|---|---|---|---|
| Surface | $C_2$ | $C_4$ | $C_6$ |
| 4 | $-5.15708 \times 10$ | $-6.38831 \times 10$ | $-8.77119 \times 10$ |

*aspherical surface,
diffractive optical surface (aspherical coefficient + phase-difference function's coefficient).

Table 5 shows a value corresponding to the conditional expression (1) according to embodiment 4.

Figure 12:
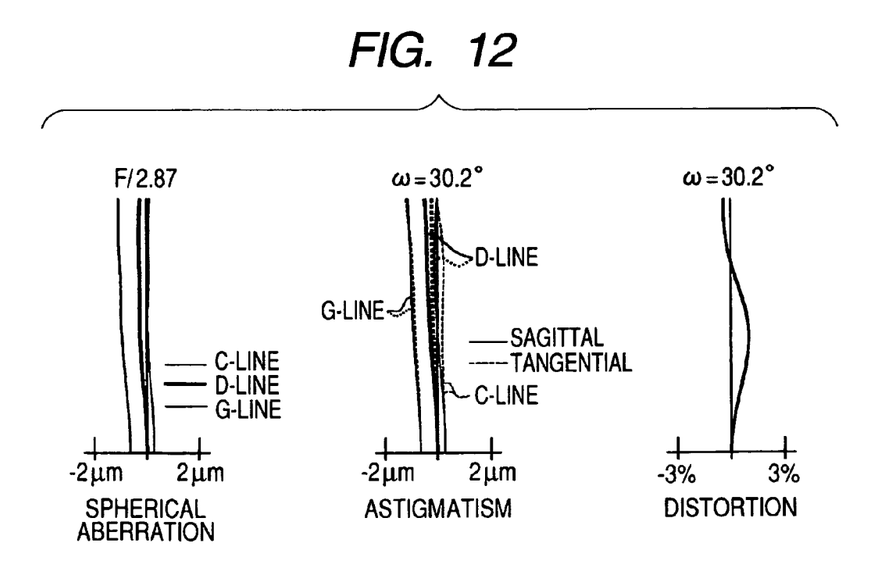
FIG. 12 is an aberration diagram showing aberrations (spherical aberration, astigmatism, distortion) on an imaging lens according to an exemplary embodiment 4.

Meanwhile, FIG. 12 is an aberration diagram showing aberrations (spherical aberration, astigmatism and distortion) on the imaging lens according to embodiment 4.

As shown in Table 4 and FIG. 12, the imaging lens in embodiment 4 is made short in overall length (6.48 mm) and can obtain a favorable optical performance despite that it is of the three-lens structure.

TABLE 5

| Embodiment 1 | 0.0021176 |
|---|---|
| Embodiment 2 | 0.0020337 |
| Embodiment 3 | 0.0020362 |
| Embodiment 4 | 0.0020317 |

Incidentally, the imaging lens in the invention is not limited to the embodiments but can be modified to various forms. For example, although the diffractive optical surface in the example was provided for only one of the lens surfaces, a plurality of diffractive optical surface may be provided.

Meanwhile, the imaging lens in the invention can be mounted on a monitor camera having an imaging device such as of a CCD or a MOS or on various optical apparatuses such as vehicular cameras, besides on a camera for a cellular phone.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-275981 filed Sep. 22 of 2005, the contents of which is incorporated herein by reference.

What is claimed is:

1. An imaging lens comprising: in order from an object side of the imaging lens,
a first lens having a positive refractive power;
a second lens having one of a positive refractive power and a negative refractive power;
a third lens that corrects for aberration,
wherein at least one of the first and second lenses has a diffractive optical surface, the diffractive optical surface having twenty or less orbicular gratings in a range to pass an effective light ray; and
an aperture stop located on an object side of the first lens or between the first and second lenses, wherein said diffractive optical surface is provided on a lens arranged closest to said aperture stop.

2. The imaging lens according to claim 1, which satisfies conditional expression (1):

$E/(N_d-1)>0.00200$ mm wherein B represents a depth of the orbicular gratings, and $N_d$ represents a refractive index at a d-line of a lens having the orbicular gratings.

3. The imaging lens according to claim 1, wherein said imaging lens has a horizontal angle of view of 50 degrees or greater.

4. The imaging lens according to claim 1, wherein said diffractive optical surface has ten or less orbicular gratings in a range to pass an effective light ray.

5. The imaging lens according to claim 1, wherein at least one of the first, second and third lenses has an aspherical surface.

6. The imaging lens according to claim 1, wherein said diffractive optical surface is provided on an object-side surface of said second lens.

7. The imaging lens according to claim 1, wherein said first, second and third lenses each have aspherical lens surfaces.

8. The imaging lens according to claim 1, wherein both lens surfaces of said first lens are spherical, and lens surfaces of said second lens and of said third lens are aspherical.

9. The imaging lens according to claim 1, wherein said second lens has a positive refractive power, and said third lens has a positive refractive power.

10. The imaging lens according to claim 1, wherein a plurality of diffractive optical surfaces with orbicular gratings are provided on a plurality of lens surfaces in said imaging lens.

11. The imaging lens according to claim 1, which satisfies the conditional expression $E/(N_d-1)>0.00203$ mm wherein B represents a depth of the orbicular gratings, and $N_d$ represents a refractive index at a d-line of a lens having the orbicular gratings.

12. The imaging lens according to claim 1, wherein both lens surfaces of said first lens are spherical.

13. An imaging lens comprising: in order from an object side of the imaging lens,
   a first lens having a positive refractive power;
   a second lens having one of a positive refractive power and a negative refractive power;
   a third lens that corrects for aberration,
   wherein at least one of the first and second lenses has a diffractive optical surface, the diffractive optical surface having twenty or less orbicular gratings in a range to pass an effective light ray; and
   an aperture stop on an object side of the first lens or between the first and second lenses,
   wherein a lens arranged closest to the aperture stop has the diffractive optical surface on a lens surface having, in the vicinity of the optical axis, a radius of curvature which is larger in absolute value than a radius of curvature of an opposite lens surface of the lens.

14. The imaging lens according to claim 13, which satisfies conditional expression (1):

$$E/(N_d-1) > 0.00200 \text{ mm}$$

wherein B represents a depth of the orbicular gratings, and $N_d$ represents a refractive index at a d-line of a lens having the orbicular gratings.

15. An imaging lens comprising: in order from an object side of the imaging lens,
   a first lens having a positive refractive power;
   a second lens having one of a positive refractive power and a negative refractive power; and
   a third lens that corrects for aberration,
   wherein at least one of the first and second lenses has a diffractive optical surface, the diffractive optical surface having twenty or less orbicular gratings in a range to pass an effective light ray, and
   wherein said orbicular gratings are recessed inward of a basic surface of the lens having said diffractive optical surface.

16. An imaging lens comprising: in order from an object side of the imaging lens,
   a first lens having a positive refractive power;
   a second lens having one of a positive refractive power and a negative refractive power; and
   a third lens that corrects for aberration,
   wherein at least one of the first and second lenses has a diffractive optical surface, the diffractive optical surface having twenty or less orbicular gratings in a range to pass an effective light ray, and
   wherein said orbicular gratings are structured so as to relieve on-axis chromatic aberration at longer wavelength.

17. The imaging lens according to claim 16, wherein an aperture stop is arranged on an object side of the first lens, and the second lens has the diffractive optical surface on an object side thereof.

18. The imaging lens according to claim 17, which satisfies conditional expression (1):

$$E/(N_d-1) > 0.00200 \text{ mm}$$

wherein B represents a depth of the orbicular gratings, and $N_d$ represents a refractive index at a d-line of a lens having the orbicular gratings.

19. The imaging lens according to claim 16, wherein an aperture stop is arranged between said first lens and said second lens.

20. The imaging lens according to claim 16, further comprising an aperture stop, wherein said diffractive optical surface is provided on a lens arranged closest to said aperture stop.

* * * * *